R. W. & B. W. PURCELL.
HOG TRAP.
APPLICATION FILED MAY 21, 1907.

No. 899,901.

Patented Sept. 29, 1908.

3 SHEETS—SHEET 1.

Witnesses
G. R. Thomas
F. G. Smith

Inventors
Ralph W. Purcell
Bert W. Purcell
By Chandler Chandlee
Attorneys

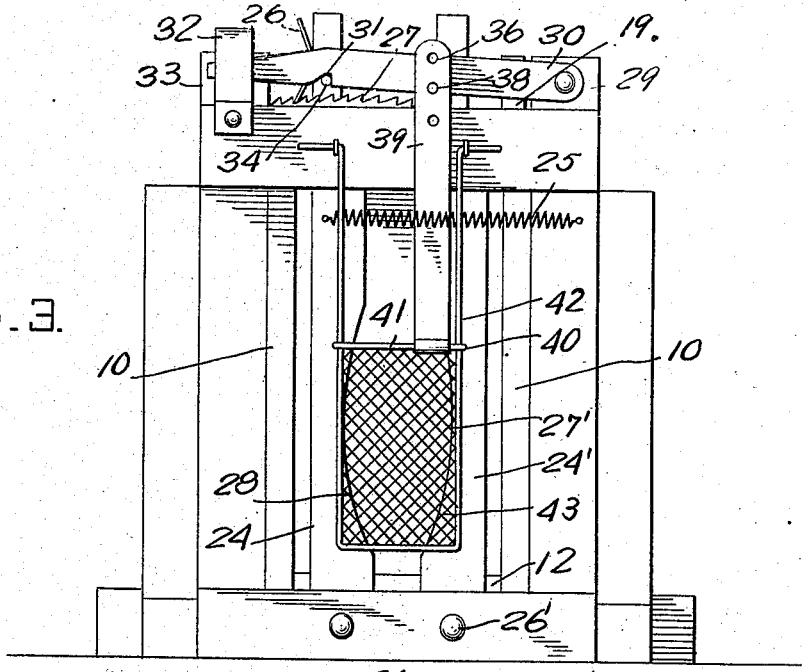
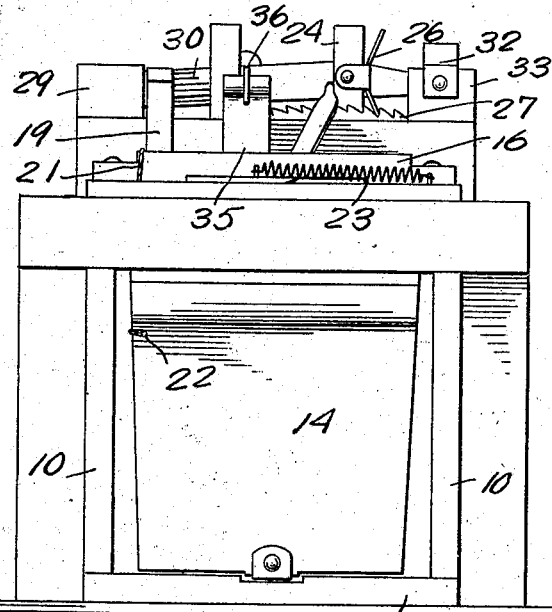

R. W. & B. W. PURCELL.
HOG TRAP.
APPLICATION FILED MAY 21, 1907.

899,901.

Patented Sept. 29, 1908.

3 SHEETS—SHEET 3.

WITNESSES:
G. R. Thomas
F. G. Smith

INVENTORS
Ralph W. Purcell
Bert W. Purcell
BY
Chandler & Chandler
Attorneys

THE NORRIS PETERS CO., WASHINGTON, D. C.

UNITED STATES PATENT OFFICE.

RALPH W. PURCELL AND BERT W. PURCELL, OF DAWN, MISSOURI.

HOG-TRAP.

No. 899,901.  Specification of Letters Patent.  Patented Sept. 29, 1908.

Application filed May 21, 1907. Serial No. 374,813.

*To all whom it may concern:*

Be it known that we, RALPH W. PURCELL and BERT W. PURCELL, citizens of the United States, residing at Dawn, in the county of Livingston, State of Missouri, have invented certain new and useful Improvements in Hog-Traps; and we do hereby declare the following to be a full, clear, and exact description of the invention, such as will enable others skilled in the art to which it appertains to make and use the same.

This invention relates to hog traps and is designed for use in trapping and holding a hog while a ring is being applied to his snout.

Practically all of such devices now in use are to be manually operated and consequently considerable time is lost unless the operator is an expert and even then there is considerable likelihood of the trap engaging the hog in such a manner to injure him.

In carrying out our invention we have provided a trap in the form of an inclosure having both of its ends open but having a door which is to be automatically dropped when the animal is within the inclosure, and a trap mechanism which is designed to engage the animal's neck as he starts to emerge through the other end of the inclosure.

Figure 1:
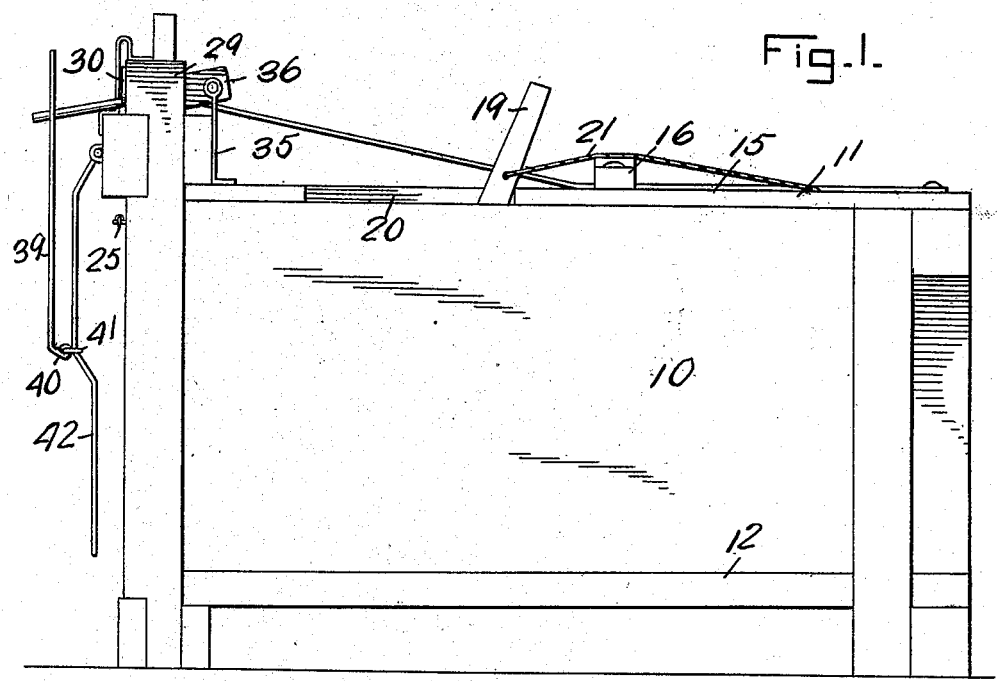
Figure 2:
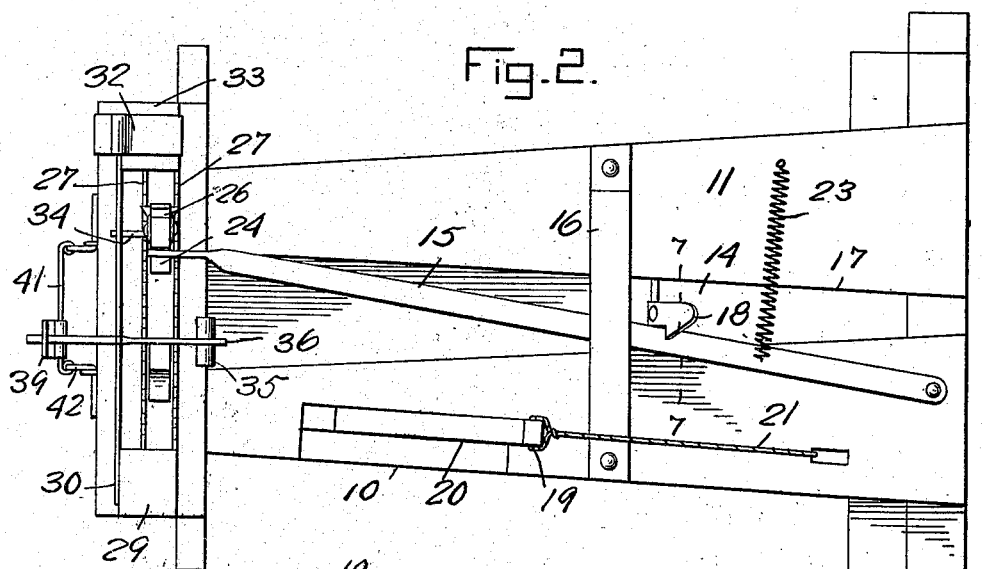
Figure 7:
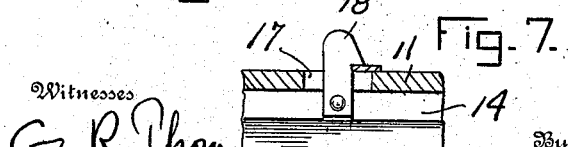
Figure 5:
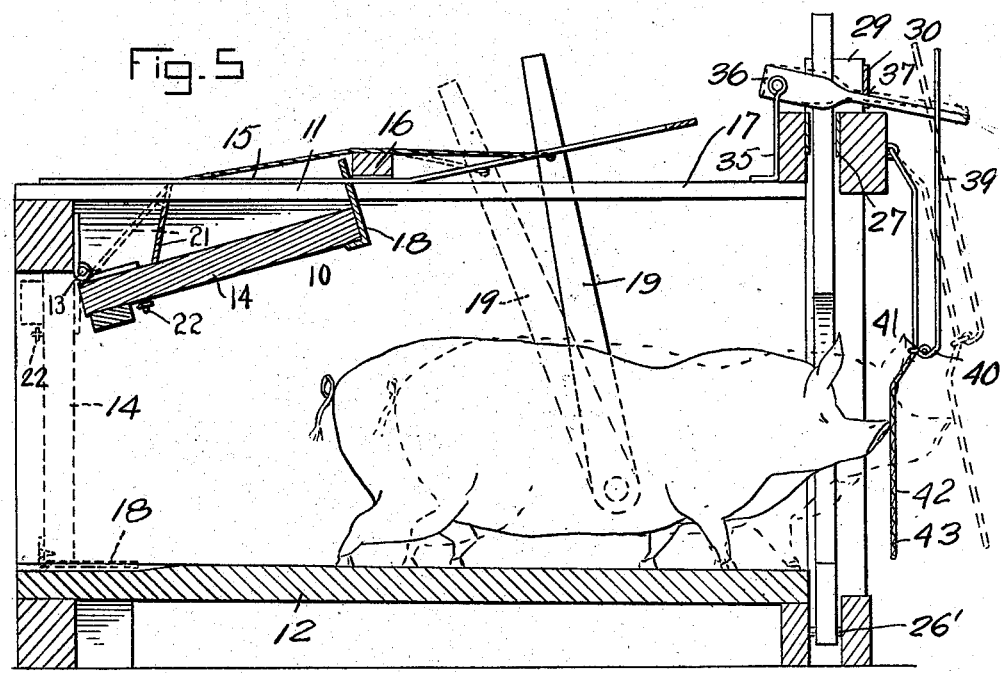
Figure 6:
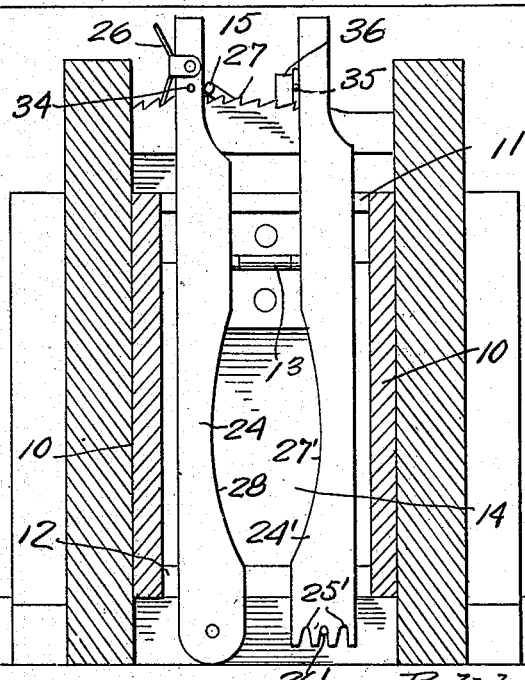

In the accompanying drawings, Figure 1 is a side elevation of the trap embodied in our invention, Fig. 2 is a top plan view, Fig. 3 is a front end elevation, Fig. 4 is a rear end elevation, Fig. 5 is a vertical longitudinal sectional view through the trap, illustrating in full lines the position of the trip devices before being moved and in dotted lines their position after being moved, the animal also being illustrated correspondingly in full and dotted lines, Fig. 6 is a vertical transverse sectional view through the trap taken in a plane adjacent the latch for holding the door in elevated position, and, Fig. 7 is a detail vertical transverse sectional view through a portion of the top of the trap showing the manner in which the door is supported in raised position.

As shown in the drawings the trap is in the form of an inclosure including sides 10, a top 11 and a floor 12. Each end of the inclosure is open and the side walls 10 of the inclosure preferably converge toward the forward end of the inclosure as clearly illustrated in the top plan view of the drawings.

Hinged as at 13 at the rear end of the inclosure is a door 14, the door being hinged at its upper edge and being therefore adapted for vertical swinging movement. Pivoted at one of its ends upon the top 11 of the inclosure adjacent the rear end thereof is a lever 15 which works in a guide 16 also secured upon the said top 11 and this lever extends partly across a slot 17 formed in the top 11 of the inclosure and is adapted for engagement by a notched latch finger 18 secured at the lower edge of the door 14 and projecting forwardly therefrom and at right angles thereto, this latch finger being designed to extend through the said slot when the door is swung vertically.

In order that the door may be swung as stated, we have provided a lever 19 which is pivoted at its lower end to the inner face of one side wall 10 of the inclosure and projects upwardly and through a slot 20 formed in the top 11, the said lever being located adjacent the forward end of the trap. A flexible connection 21 leads from this lever to a pin 22 upon the door 14 adjacent the upper edge thereof and to one side of the same and it will be understood that by rocking the lever, forwardly, the door will be swung upwardly to permit entrance of the animal into the trap. When the door is swung as stated, the latch finger 18 thereon engages the lever 15 and the door is therefore supported in raised position until such time as the lever 15 will be moved, there being a spring 23 connected with the lever and with a pin upon the top of the inclosure and serving to hold the said lever in position for such engagement by the latch finger, the force exerted by the spring being limited by the guide 16.

The trap mechanism proper will now be described.

Pivoted at its lower end at the front end of the inclosure and adapted for swinging movement across the said front end is a lever 24 and connected with this lever and with one side of the inclosure at the said forward end thereof is a spring 25 the tendency of which is to normally hold the lever, 24, at the limit of its movement toward the upright 24'. Pivoted to the upper end of the lever is a hand operated pawl 26 which coöperates with rack bars 27 supported above the top of the inclosure at the forward end thereof. The lever works through a slot and the rack bars are located one upon each side of the slot so that the lever works between the rack bars and the rack teeth of the bars are presented in the direction in which the lever is drawn by the spring 25. This lever 24 has its edge which opposes the side of the inclosure toward which the lever is pulled by the spring 25 concaved as indicated at 28 and coöperates with an upright 24' which has its lower end provided with a plurality of notches 25' in any one of which a bolt 26' may be received. This upright also has its edge opposing the lever 24, concaved, as indicated at 27' and it is between the lever 24 and the upright that the neck of the animal is received, it being understood of course that the notches in the lower end of the upright permit of adjustment of the trap to suit hogs of various sizes. It will be further understood that by reason of the direction in which the rack teeth are pointed the lever after having been sprung to so engage the neck of the hog will be held in such engagement by reason of the engagement of the pawl with the rack teeth.
There are a plurality of such rack teeth as clearly shown in the drawings and hence it will be apparent that a large or small hog can be held by the action of the lever. In order that the lever may be held against the tension of the spring and in position to be sprung and in order that it may be released, we have provided devices which will now be explained.

Pivoted at one of its ends to an upright 29 at one side of the inclosure at the forward end thereof is an arm 30 which is provided with a notch 31 and which works at its free end in a guide 32 secured upon a similar upright 33 at the opposite side of the front end of the inclosure. A pin 34 projects forwardly from the lever 24 and the arm 30 rests by gravity upon the said pin at all times and when the lever is moved to the limit of its movement against the tension of the spring 25 the arm will drop and the pin will engage in the notch 31. The engagement of this pin in the notch will serve to hold the lever at the said limit of its movement. Pivoted to a bracket 35 is an arm 36 which extends forwardly and in a notch 37 formed in the arm 30 and at its extreme forward end this arm 36 is engaged in one of a series of openings 38 in a bar 39 which is pivoted as at 40 to a cross bar 41 forming a portion of a frame 42. This frame 42 is hinged at its upper end to the forward end of the inclosure and stretched across the frame from side to side and from its lower end to the cross bar is wire netting 43. That portion of the frame which has the netting stretched across it is positioned directly in advance of the opening at the front end of the inclosure formed by the lever 24 and the opposing upright 24' and it will be readily understood that the door 14 being raised and the trap mechanism having been set, when a hog is driven into the inclosure through the rear end the animal will of course attempt to escape through the forward end of the inclosure and in doing so will strike the wire netting upon the frame 42 and will swing this frame forwardly and outwardly. In doing this the bar 39 will be moved upwardly and will result in a vertical swinging movement of the arm 36. As this arm 36 raises, it lifts the arm 30 and the lever 24 is released and is acted upon by the spring 25 to be quickly swung to grasp the neck of the animal therebetween and the before mentioned side of the inclosure. The forward end of the lever 15 extends in the path of movement of the lever 24 and it will be seen that when the lever 24 strikes the lever 15, the latter will be swung to release the door at the rear end of the inclosure.

What is claimed is—

1. A trap of the class described comprising an inclosure open at both ends, a door hinged at one end of the inclosure for vertical swinging movement therewithin, means for holding the door in raised position, means for releasing the door to permit the same to drop and close the said end of the inclosure, a member pivotally arranged at the opposite end of the inclosure and adapted to swing in the direction of one side thereof, a spring exerting a tendency to so swing the said member, a pin carried by the member, a pivoted latch arm resting by gravity upon the pin and provided with a notch into which the pin is adapted to seat when the member is at the limit of its movement against the tension of the spring, a trip frame hinged at the said end of the inclosure and extending in advance of the same, a pivoted arm extending beneath the latch arm, and connection between the trip frame and the last mentioned arm.

2. A trap of the class described comprising an inclosure open at both ends, a door hinged at one end of the inclosure for vertical swinging movement therewithin, means for holding the door in raised position, means for releasing the door to permit the same to drop and close the said end of the inclosure, a member pivotally arranged at the opposite end of the inclosure and adapted to swing in the direction of one side thereof, a spring exerting a tendency to so swing the said member, a pin carried by the member, a pivoted latch arm resting by gravity upon the pin and provided with a notch into which the pin is adapted to seat when the member is at the limit of its movement against the tension of the spring, a trip frame hinged at the said end of the inclosure and extending in advance of the same, a pivoted arm extending beneath the latch arm, and a bar pivoted to the frame and provided with a plurality of openings into which the free end of the pivoted arm may be interchangeably engaged.

3. A trap of the class described comprising an inclosure open at both ends, a door hinged at one end of the inclosure for vertical swinging movement therewithin, means for holding the door in raised position, means for releasing the door to permit the same to drop and close the said end of the inclosure, a member pivotally arranged at the opposite end of the inclosure and adapted to swing in the direction of one side thereof, a spring exerting a tendency to so swing the said member, a pin carried by the member, a pivoted latch arm resting by gravity upon the pin and provided with a notch into which the pin is adapted to seat when the member is at the limit of its movement against the tension of the spring, a trip frame hinged at the said end of the inclosure and extending in advance of the same, a pivoted arm extending beneath the latch arm, a bar pivoted to the frame and provided with a plurality of openings into which the free end of the pivoted arm may be interchangeably engaged, rack bars between which the pivoted member moves, and a pawl carried by the member and engageable with the rack bars to prevent movement of the member against the tension of the spring at times.

In testimony whereof, we affix our signatures, in presence of two witnesses.

RALPH W. PURCELL.
BERT W. PURCELL.

Witnesses:
L. A. CULVER,
G. W. PURCELL.